United States Patent Office 3,455,513
Patented July 15, 1969

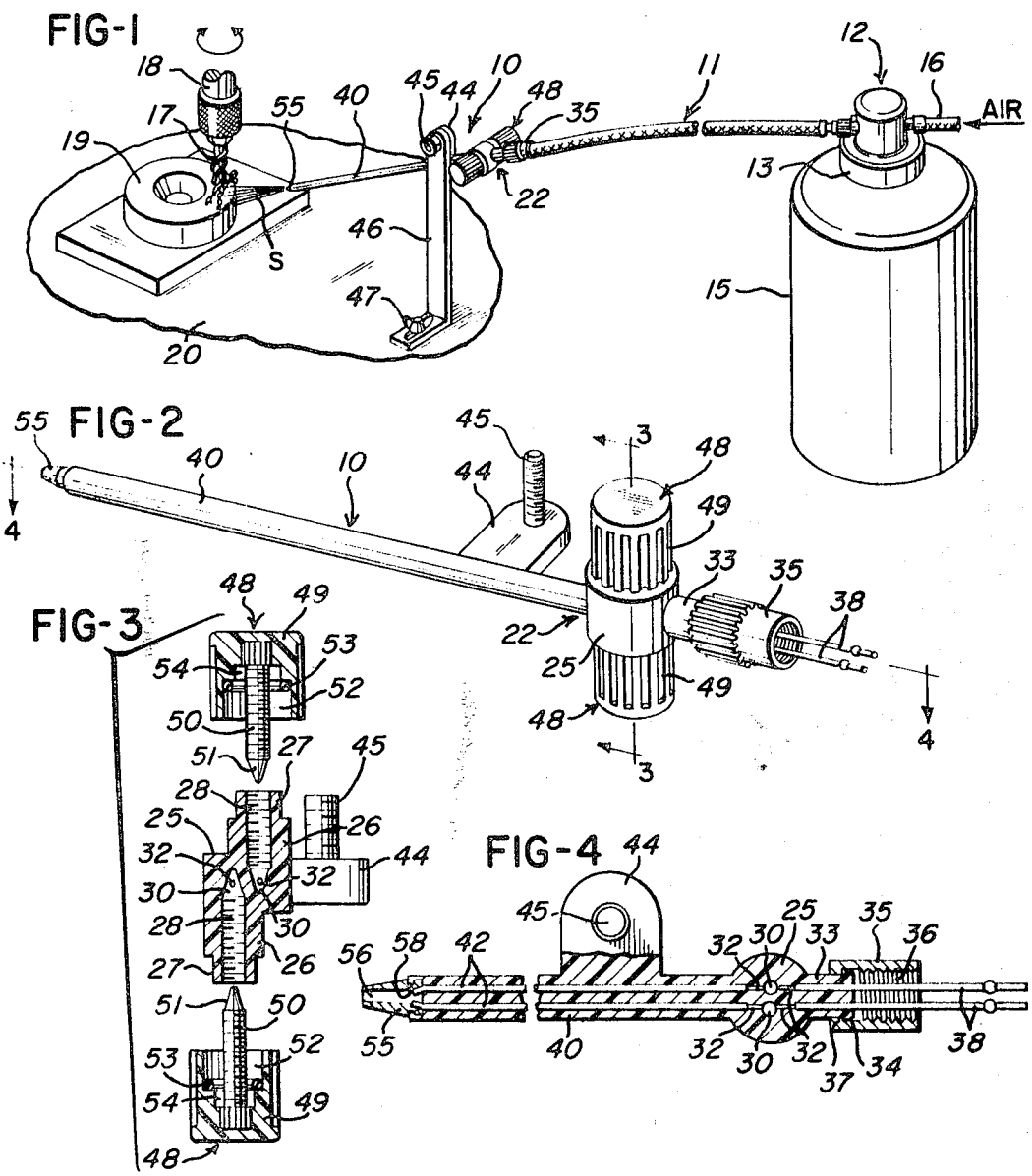

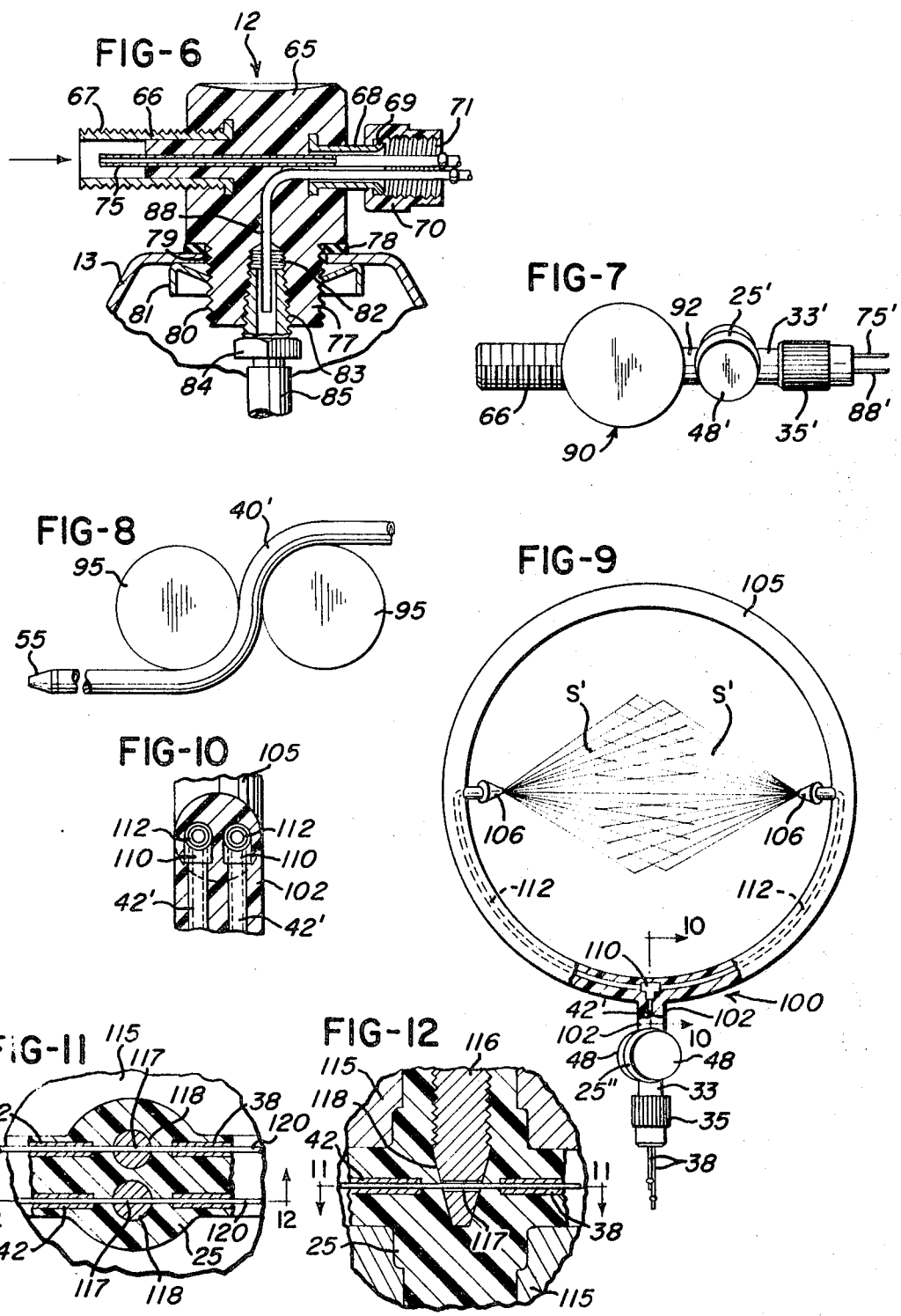

3,455,513
TOOL COOLING SYSTEM AND METHOD FOR PRODUCING THE SAME
Harold G. Wyse, Dayton, Ohio, assignor to Gad-Jets, Inc., Dayton, Ohio, a corporation of Ohio
Filed Mar. 17, 1967, Ser. No. 624,053
Int. Cl. B05b 7/00; A62c 13/26; F23d 11/10
U.S. Cl. 239—366    14 Claims

ABSTRACT OF THE DISCLOSURE

A coolant dispensing system for machining operations, having a nozzle connected by a pair of tubes of small cross-sectional area encased in a protective plastic housing and corresponding lines to manifold where one tube is supplied with liquid coolant and the other is supplied with pressurized air, including a compact molded plastic manifold and valves in each line having a common molded plastic body for controlling the flow of air and liquid coolant through the tubes to produce a spray or mist having the optimum air to liquid ratio, and a method of forming such apparatus.

Background of the invention

During the operations of cutting, grinding, milling, shaping, drilling, tapping and other machining operations, it has been found desirable to direct a finely atomized spray or mist onto the tool and workpiece for absorbing heat from the tool to prevent overheating and thereby increase the service life of the tool and enable the tool to be operated at higher speeds and feed rates. The fine mist form of cooling is produced by aspirating a liquid with pressurized air and has the advantage that it provides cummulative cooling since the expanding air cools the mist and the cool mist then evaporates immediately from the tool and workpiece to produce additional substantial cooling by evaporation. Further, the evaporation of the coolant eliminates clean-up problems normally associated with collecting, filtering and recirculating fluid type coolants which are commonly used to flood the tool and workpiece to provide cooling.

Providing the optimum air to liquid ratio for each machining or grinding operation is of substantial importance since it is desirable to eliminate large droplets of liquid while also providing for varying the flow rate of the liquid as required by the particular application. Thus it is necessary to provide separate control valves with precise adjustment for the liquid coolant and pressurized air supply lines. In prior art systems for dispensing a cooling mist, the air to liquid ratio was customarily adjusted by valves adjacent a manifold attached to the closure for the liquid coolant container. Commonly, the manifold is machined from metal to provide the necessary liquid and air passageways and to form the body for a corresponding needle valve which controls the flow of liquid coolant and air through the passageways and through the flexible lines connecting the passageways to corresponding passageways machined within a metal dispensing nozzle.

It is frequently desirable to provide the control valves in close proximity to the dispensing nozzle and in compact spaced relation so that the discharged mist can be observed while valve adjustments are made. Furthermore, on some automatic machine tools, it is common to employ a substantial number of nozzles for cooling multiple tool elements and usually the supply lines to each nozzle are provided with corresponding valves for controlling the mist from the nozzle. On such a machine, it is also desirable to have the valves close to the nozzles to avoid necessity for tracing the respective liquid and air supply lines back to their corresponding valves on the manifold when adjustment is required.

Summary of the invention

The present invention is directed to an improved system for dispensing liquid coolant under relatively high pressure in the form of an atomized spray or mist and is especially directed to a system which includes a compact valve assembly, a compact manifold, and an economical method for producing the same. According to one form of the invention, the mist is dispensed from a nozzle which is connected to small liquid and air supply tubes encased within an elongated neck portion of a plastic housing which also forms a compact body for the valves which control the flow of liquid and air through the tubes.

The housing is molded with use of flexible wires which extend as mandrels through the tubes and aligned holes formed within threaded insert studs. After molding, the wires and studs are removed to provide corresponding valve chambers and passageways within the plastic valve body. Preferably, the housing is formed of a thermoplastic material so that the neck portion of the housing may be formed with heated rolls or the like to a configuration adapted for use on a particular machine. In accordance with another form of the invention, the body for the control valves is molded as an integral part of the manifold by using the same wire technique as described above.

Cooling by means of the system of the invention is particularly effective because of the high air pressure which can be used and the close control of the position and direction of the spray which it provides. That is, the liquid coolant and high pressure air are carried by a pair of tubes having passageways of the order of ⅟₃₂ to ⅟₁₆ inch in diameter which enables operation at shop line pressure usually between 100 and 150 p.s.i. This higher pressure provides for application of the coolant air mixture at a faster rate and for substantial expansion of the resulting coolant/air mixture at the nozzle thereby producing greater cooling effect.

Additionally the relatively small size of the nozzles and the relative simplicity of adjusting and directing them provides for directing the spray immediately at the point of contact between the tool and the workpiece. Thus the coolant acts to dissipate the frictional heat as it is produced. Comparative demonstrations of a system of the invention with flood-type cooling shows that by use of the system of the invention, it is ordinarily possible to maintain the temperature in the cutting area below room temperature, while the same machining operation with conventional flood-type cooling results in a constant building up of the temperature in the workpiece and tool.

It is believed the conventional flood-type coolant becomes a heat sink which does not absorb and carry away the total heat generated by the cutting friction as fast as it is produced. By reason of the increased evaporative speed of the relatively high pressure of the invention and its evaporative process, the heat is immediately dissipated to the atmosphere and is never permitted to build up. Tests in actual commercial operation have shown, for example, that the life span of a cutter working on 4130 steel for a military application has been increased from a capability of five workpieces to a capability of some fifty-five workpieces, or more than a ten fold increase in tool life span.

The relatively high pressure at which the system operates provides the further advantage of substantial aspiration so that the system will operate successfully with the discharge nozzle located some nine feet higher than the coolant tank, permitting substantial economy and flexibility in operation. By reason of the comparatively little space required by the nozzles, the encased tubes, and the valves, the system can be adapted for use on machines where conventional flood-type cooling is not practical, for example, on radial drills, and drill presses not fitted with pans.

Other features and advantages of the invention will be apparent from the following description, the accompanying drawings and the appended claims.

Brief description of the drawings

FIG. 1 is a perspective view of a coolant dispensing system constructed in accordance with the invention which illustrates a typical application of discharging a coolant mist during a drilling operation;

FIG. 2 is an enlarged perspective view of the dispensing device shown in FIG. 1;

FIG. 3 is a section taken generally along the line 3—3 of FIG. 2 with the control valve members removed from the valve chambers;

FIG. 4 is a section taken generally along the line 4—4 of FIG. 2;

FIG. 5 is a fragmentary view of a stud which is used during the molding of the dispensing device;

FIG. 6 is a section of the manifold shown in FIG. 1;

FIG. 7 is a top view of an integral manifold and control valves constructed in accordance with the invention;

FIG. 8 is a top view of a pair of heated rolls illustrating the subsequent forming of the neck portion of the dispensing device shown in FIG. 2;

FIG. 9 is a view of a modified dispensing device constructed in accordance with the invention;

FIG. 10 is a fragmentary section taken generally along the line 10—10 of FIG. 9; and FIGS. 11 and 12 illustrate the method for forming a valve body in accordance with the invention.

Description of the preferred embodiments

Referring to the drawings which illustrate preferred embodiments of the invention, FIG. 1 shows a coolant dispensing system constructed in accordance with the invention and which generally includes a dispensing device 10 connected by a flexible line 11 to a manifold 12 which is mounted on a closure or cap 13 of a liquid coolant container 15. Preferably the liquid coolant is a water base solution with a water soluble rust inhibitor and ingredients to eliminate the causes of rancidity and unpleasant odors.

Pressurized air is supplied to the manifold 12 through a line 16 and the dispensing device 10 utilizes the air to aspirate the liquid coolant in the desired liquid/air ratio to produce a controlled atomized spray S which is directed onto the tool element and workpiece. For purposes of illustration, the tool element is represented by a drill 17 retained within a rotatable chuck 18 and the workpiece is represented by a collar 19 supported by a worktable 20.

Referring to FIGS. 2–4, which show the detailed construction of the dispensing device 10, a body 22 is molded from a thermoplastic material, as for example, nylon filled with carbon black, and includes a valve body portion 25 having a pair of transversely oriented and longitudinally offset cylindrical bosses 26 from which extend cylindrical neck portions 27. A valve chamber 28 having internal threads, is formed within each of the bosses 26 and corresponding neck portions 27 and terminates with valve seat 30 of predetermined shape which in the illustrative application may conveniently be frusto-conical, as shown. Aligned inlet and outlet passageways 32 (FIG. 4) extend within the valve body portion 25 laterally from each valve seat 30. As shown in FIG. 3, the tapered valve seats 30 are formed in closely spaced relationship within the valve body portion 25 and the axes of the chambers 28 extend in parallel slightly offset relationship.

The body 22 further includes a cylindrical portion 33 extending rearwardly from the valve body portion 25 and having an outwardly projecting circumferential flange 34. A tubular fitting 35 is mounted for rotation on the cylindrical portion 33 of the body and includes internal threads 36 and an inwardly projecting annular flange 37 which is adapted to seat against the flange 34 when the fitting is connected to the flexible line 11. A pair of metal inlet tubes 38 extend through the fitting 35 and the body portion 33, and terminate adjacent but in spaced relation to the corresponding valve seats 30, in aligned relation to the pair of passageways 32 to form axial extensions of these passageways.

An elongated cylindrical neck portion 40 extends forwardly from the opposite side of the valve body portion 25 in alignment with the portion 33 and perpendicular to the axes of the valve chambers 28. A pair of metal discharge tubes 42 extend through the elongated neck portion 40 and have inlet ends spaced adjacent the seats 30 to form axial extensions of the passageways 32 through the neck portion. The body 22 further includes an integrally formed ear 44 from which extends a screw 45. As illustrated in FIG. 1, the ear 44 and screw 45 enable the dispensing device to be conveniently and quickly mounted adjacent the tool, as for example, on an angle bracket member 46 which is secured to the table 20 by a bolt 47.

A valve member 48 is mounted within each valve chamber 28 and includes a molded plastic, generally cylindrical cap 49 supporting a coaxially extending threaded valve stem 50 having a frusto-conical or tapered end portion 51. A cylindrical cavity 52 is formed within each cap 49 and retains an O-ring seal 53 and a smaller cylindrical cavity 54 extends from the cavity 52. The valve stem 50 is threaded into the corresponding valve chamber 28 causing the tapered end portion 51 to engage the mating seat 30 for closing the corresponding passageways 32 and the neck portion 27 to project into the cavity 54. When the valve is opened and fluid is metered through the passageways 32, the O-ring seal 53 engages the outer surface of the neck portion 27 and forms a fluid tight seal between the valve member 48 and the valve body portion 25 throughout the effective range of adjustment of the valve member.

A nozzle 55 (FIG. 4) having a discharge orifice 56 is connected to the forward end portion of the tubes 42 so that the passageways defined by the tubes open into the orifice 56. A circumferential groove 58 is formed within the nozzle 55 for receiving a portion of the molded plastic material forming the neck portion 40 to form a positive connection between the neck portion 40 and the nozzle 55.

FIG. 6 shows the detailed construction of the manifold 12 which includes a molded plastic body 65 in which is inserted a tubular fitting 66 having external threads 67 for attaching the air supply line 16. A tube 68 is also inserted within the body 65 in diametrically opposed relation to the fitting 66 and projecting radially outwardly from the body. A peripheral flange 69 is formed on the outer end of the tube 68 and retains a tubular fitting 70 having internal threads 71 and constructed in a manner similar to the fitting 35 for receiving the opposite end of the flexible line 11. A small preformed tube 75 is inserted within the body 65 between the fittings 66 and 70 and defines an air passageway which connects the air supply line 16 to the corresponding air supply passageway within the line 11.

The manifold body 65 includes an integral portion 77 which receives an annular gasket 78 and projects through an opening 79 formed within the cap 13. The portion 77 is provided with external threads 80 for receiving a nut 81 to compress the gasket 78 and form a seal between the manifold 12 and the cap 13. A central hole 82 is formed within the body portion 78 and is provided with internal threads 83 for receiving a fitting 84 connected to the end of a flexible liquid coolant supply line 85 which extends down into the container 15. A small diameter tube 88 extends from the opening 82 and curves within the body 65 so that it projects outwardly through the fitting 70 in close parallel relation to the tube 75.

In operation, the flexible line 11 is connected to the manifold 12 and the dispensing device 10 by connecting the female fittings 35 and 70 to male fittings secured to opposite ends of the line 11. In this manner, the ends of the tubes 38 and the tubes 75 and 88 are inserted into opposite ends of corresponding conduits formed within the line 11. When the valve member 48 for the air supply line is opened, pressurized air is directed to and discharged from the orifice 56 within the nozzle 55. Thus, when the valve member for the liquid coolant supply line is opened, the expanding air within the nozzle 55 aspirates the liquid coolant from the container 15 to the nozzle for producing a fine mist or spray. The relative flow of pressurized air and liquid coolant may be precisely selected simply by adjusting the corresponding valve members 48 which, in turn, determine the proportions of air and liquid coolant which flow through the corresponding passageways 32 extending from the valve seat 30.

FIG. 7 shows a modified embodiment of the invention in which the valve members 48' are spaced adjacent the manifold 90 rather than in close proximity to the dispensing nozzle 55 as is provided in the embodiment shown in FIG. 2. In this embodiment, a manifold 90 is constructed substantially the same as the manifold 12 and includes the tubular fitting 66 for the connection of the air supply line 16. In place of the insert tube 68, however, the manifold 90 is provided with an integral boss 92 which integrally connects with a valve body 25' having the same construction as the valve body 25 shown in FIGS. 2–4 including a portion 33' which rotatably supports a fitting 35' for connecting an air supply tube 75' and liquid coolant supply tube 88' to the corresponding conduits within the flexible line 11.

Referring to FIG. 8, a pair of heated mandrels or rolls 95 are rigidly supported to define a space therebetween for receiving the elongated neck portion 40 of the dispensing device. The rolls are effective to heat the neck portion sufficiently so that it may be formed to a configuration which is adapted for use on a particular machine. As illustrated, the neck portion 40' is formed with an S-shaped curve, however, it is to be understood that the neck portion may be formed to other configurations. The invention provides the advantage that the molded plastic casing enclosing the tubes permits substantial working of the combined unit to form a variety of shapes to meet particular requirements in use without danger of crushing the tubes or significantly reducing their internal cross-section.

FIGS. 9 and 10 show a dispensing device 100 which forms a further embodiment of the invention. Instead of the straight elongated neck portion 40 as shown in FIG. 2, the device 100 includes a body having a short neck portion 102 which supports an annular portion 105 having a pair of diametrically opposed nozzles 106. The portion 105 is formed integrally with a valve body 25" which has a construction identical to the valve body 25 shown in FIG. 2. Thus the valve body 25" receives valve members 48 and has an integral neck portion 33 which supports a fitting 35.

A pair of short metal tubes 42' extend through the neck portion 102 and connect with corresponding tees 110 from which tubes 112 extend to each of the nozzles 106. Thus in the embodiment of FIG. 9, the liquid coolant is discharged in two sprays S' directed from the opposing nozzles 106 downwardly on the tool, as for example, a drill 17 extending downwardly through the center of the annular portion 105. While the embodiment shown in FIG. 9 illustrates two diametrically opposed nozzles 106, it is to be understood that more than two nozzles may be spaced around the annular portion 105 if it is desirable to have several mists or sprays of coolant directed at the tool element from different angles to provide faster cooling by connecting additional nozzles at the desired positions to the tube 112.

In the production of the dispensing device 10, the body 22 is molded after the tubes 38 and 42, nozzle 55 and screw 45 are inserted within the cavity of a mold 115 (FIGS. 11 and 12) along with a pair of threaded metal studs 116 (FIG. 5) which have substantially the same predetermined configuration as the valve stems 50 with which they are adapted to cooperate. A small hole 117 is formed within the end portion 118 of each of the studs 116 and the hole is aligned with the passageways defined by the tubes 38 and 42.

A pair of flexible wires 120 (FIGS. 11 and 12) are extended through the tubes 38 and 42 and the aligned holes 117 within the studs 116 so that after the body 22 is molded and cured, the wires are pulled from the tubes to form the passageways 32. The threaded studs 116 are then unscrewed from the valve body portion 25 to form the corresponding valve chambers 28 with the internal threads and the valve seats 30 of the desired conformation. The fitting 35 is assembled to the body portion 33 by forcing the flange 37 of the fitting over the flange 34. The removable wires 120 and studs 116 are also used for producing the dispensing device 100 shown in FIG. 9 and the integral manifold 90 and valve body 25' shown in FIG. 7. It has also been found desirable to extend wires through the insert tubes 75 and 88 before molding the manifold 12 to prevent the tubes from being plugged.

As appears from the drawing and the foregoing description, a coolant dispensing system constructed in accordance with the present invention provides a number of desirable features and advantages. The overall compactness of the dispensing device 10 is especially desirable in that it enables the control valves to be located in close proximity to the nozzle 55 without occupying significant space in the area surrounding the tool element. By molding the valve chambers 28 and seats 30 in plastic and in offset parallel relationship as shown in FIG. 3, the device 10 has an unusually compact and economical construction which is relatively easy to mold.

As mentioned above, the close proximity of the control valves in relation to the tool element is desirable to provide for convenient adjustment of the air to liquid ratio of the spray directed from the nozzle 55 onto the tool element. Thus maximum cooling may be obtained by adjusting the spray of moist air so that substantially none of the liquid coolant takes the form of large droplets or globules and that the coolant is dispersed wholly in the form of a fine mist. Such a spray can most conveniently be obtained by adjusting the valves precisely while the spray is being observed.

An important feature is provided by employing the tubes 42 which define small passageways of the order of $\frac{1}{32}$ inch to $\frac{1}{16}$ inch in diameter and by encasing the tubes in the plastic housing portion 40. That is, the tubes 42 enable high pressure air to be used for obtaining substantial expansion of the discharged mist for providing maximum cooling and, in addition, provide for substantial aspiration so that the container of liquid coolant may be located several feet below the nozzle. For example, it has been found that the high pressure air will elevate the liquid coolant by aspiration up to nine feet. Furthermore, the plastic housing not only protects the tubes 42 but enables the tubes to be easily formed to the desired configuration as illustrated in FIG. 8.

Another desirable feature is provided by employing the small tubes 38 and 42 within the corresponding body portions 33 and 40 to form small closely adjacent passageways and thereby enable the outside dimensions of the body portions 33 and 40 to be minimized. As a result, the nozzle 55 can be located in a confined area adjacent a tool without occupying significant space. Furthermore, the overall compactness of the device 10 enables a substantial number of coolant dispensing devices to be used on a machine tool without interfering with the movements of the tool element or obstructing the view of the machining or grinding operation. The integrally molded plastic body portions 33 and 40 also provide a rigid casing for the small diameter tubes 38 and 42 and thereby protect the tubes from being accidentally damaged.

By using the removable flexible wire technique in molding the body 22, the elongated body portion 40 may be formed in a wide range of shapes since the wires can be removed from curved tubes after the body is molded and cured. For example, the end portion of the body portion 40 may be molded with a 45° or 90° angle or any other angle so that the nozzle 55 will direct the fine spray in a direction which is most suitable for use in a confined space adjacent the tool element to avoid obstructing the view of the machining operation.

As illustrated in FIG. 8, it is also possible to form the elongated neck portion 40 after the body is molded simply by heating the neck portion and forming it around rolls 95. That is, the plastic body portion 40 encases the tubes 42 and maintains their cross-sectional area during forming and thereby prevents the tubes from being crimped.

The integrally formed manifold and valve body shown in FIG. 7 illustrates a modification of the invention which is particularly adapted for use with a single nozzle and where the container of liquid coolant can be located relatively close to the nozzle so that valve adjustments can be made while observing the spray. The modification shown in FIG. 9 illustrates a multiple nozzle dispensing device which can be economically formed using the wire technique of the invention. The device 100, however, is well suited also for use with a remotely located container of liquid coolant.

The manifold 12 shown in FIG. 6 provides the advantage of significantly lower cost construction over a corresponding unit of metal. That is, by inserting the metal tubes 75 and 88 along with the fitting 66 and tube 68 within the plastic molded body 65 before molding, the manifold 12 can be constructed without requiring any subsequent drilling and threading operations.

What is claimed is:

1. Apparatus for dispensing a liquid coolant in the form of a controlled atomized spray to provide evaporative cooling of a tool or the like, comprising a valve body defining an air valve chamber and a liquid coolant valve chamber each having a valve seat therein, said valve body forming air inlet and outlet passageways extending from said air valve chamber and liquid coolant inlet and outlet passageways extending from said coolant valve chamber, a manifold integrally connected to said valve body and encasing an air tube and a coolant tube for connecting said inlet passageways to corresponding supply lines of liquid coolant and pressurized air, a pair of discharge tubes defining air and coolant discharge passageways connected to the corresponding said outlet passageways, said discharge tubes including discharge end portions, a nozzle member connected to said discharge end portions, body means encasing said discharge tubes, and a valve member mounted within each said valve chamber and having an end portion in adjustable relationship with said seat for separately controlling the flow of air and coolant through said discharge passageways to said nozzle and thereby control the atomized spray from said nozzle.

2. Apparatus as defined in claim 1 including fitting means on said manifold for connecting said supply lines.

3. Apparatus for dispensing a liquid coolant in the form of a controlled atomized spray to provide evaporative cooling of a tool or the like, comprising a plastic valve body including means defining an air valve chamber and a liquid coolant valve chamber each having a valve seat therein, means defining air inlet and outlet passageways within said body extending from said air valve chamber and liquid coolant inlet and outlet passageways extending from said coolant valve chamber, means for connecting said inlet passageways to corresponding supply lines of liquid coolant and pressurized air, a pair of tubes defining air and coolant discharge passageways connected to the corresponding said outlet passageways, said tubes including discharge end portions, a nozzle member connected to said discharge end portions of said tubes, said body including integral plastic body means protectively encasing said tubes, and a valve member mounted within each said valve chamber and having an end portion in adjustable relationship with said seat for separately controlling the flow of air and coolant through said discharge passageways to said nozzle and thereby control the atomized spray from said nozzle.

4. Apparatus as defined in claim 3 wherein said valve members are arranged in close proximity to said nozzle, and said tubes have inlet ends spaced adjacent the corresponding valve chambers and connected to said chambers by said outlet passageways.

5. Apparatus as defined in claim 3 wherein said nozzle includes means defining an external peripheral groove therein, and said body means encasing said tubes include a portion extending into said groove to form a positive connection between said body means and said nozzle.

6. Apparatus as defined in claim 3 wherein said body means encasing said tubes has substantial length relative to its cross-sectional thickness.

7. Apparatus as defined in claim 3 wherein said body means encasing said tubes comprise an elongated thermoplastic neck portion in molded contact with said tubes to provide for heating and forming said neck portion and said tubes subsequent to molding said body means.

8. Apparatus for dispensing a liquid coolant in the form of a controlled atomized spray to provide evaporative cooling of a tool or the like, comprising a plastic valve body including means defining an air valve chamber and a liquid coolant valve chamber each having a valve seat therein, means defining air inlet and outlet passageways extending from said air valve chamber and liquid coolant inlet and outlet passageways extending from said coolant valve chamber, means for connecting said inlet passageways to corresponding supply lines of liquid coolant and pressurized air, plastic body means integrally connected to said valve body and projecting outwardly therefrom, means defining air and coolant discharge passageways within said body means and connected to the corresponding said outlet passageways, a nozzle member connected to said body means, and a valve member mounted within each said valve chamber and having an end portion in adjustable relationship with said seat for separately controlling the flow of air and coolant through said discharge passageways to said nozzle and thereby control the atomized spray from said nozzle.

9. Apparatus as defined in claim 8 wherein each said valve seat is tapered and each said valve chamber has internal threads, said inlet and outlet passageways extend from the corresponding said valve seat, and each said valve member includes a threaded shank and a tapered end portion for engaging the corresponding said valve seat to close the corresponding said inlet and outlet passageways.

10. Apparatus as defined in claim 8 wherein said valve chambers extend in generally parallel offset relationship from opposite sides of said body, and said tapered valve seats are spaced in adjacent relationship to provide a compact body in addition to simplifying the molding of said body.

11. Apparatus as defined in claim 8 including an ear formed integrally with said body, and a threaded fastener inserted within said ear to provide for convenient mounting of said apparatus on a support member.

12. Apparatus as defined in claim 8 wherein said means connecting said inlet passageways to corresponding supply lines include a tube extending from adjacent the corresponding said valve seat, said valve body including an integral portion encasing at least a portion of said tubes, a circumferential flange projecting outwardly from said cylindrical body portion, and said connecting means include a tubular fitting rotatably mounted on said body portion and adapted to apply a coupling force against said flange when connecting said tubes to the liquid coolant and pressurized air supply lines.

13. Apparatus as defined in claim 8 wherein said means for connecting said inlet passageways to corresponding supply lines of liquid coolant and pressurized air include a manifold, an air tube and a coolant tube extending through said manifold, and means including a flexible line for connecting said air and coolant tubes to the corresponding said inlet passageways within said valve body.

14. Apparatus as defined in claim 8 including a plurality of said nozzles, a pair of tubes connected to each said nozzle and defining said discharge passageways, means for connecting each said discharge passageway to the corresponding said outlet passageway, and said plastic body means being in molded contact with all of said tubes.

References Cited
UNITED STATES PATENTS

| | | | |
|---|---|---|---|
| 2,929,566 | 3/1960 | Paasche | 239—273 |
| 3,253,788 | 5/1966 | McHugh | 239—413 |

M. HENSON WOOD, JR., Primary Examiner

RICHARD A. SCHACHER, Assistant Examiner

U.S. Cl. X.R.

239—414, 423